US010781506B2

(12) United States Patent
Komon et al.

(10) Patent No.: US 10,781,506 B2
(45) Date of Patent: Sep. 22, 2020

(54) MAKING MINERAL SALTS FROM VARIOUS SOURCES

(71) Applicant: LIXIVIA, INC., Santa Barbara, CA (US)

(72) Inventors: Zachary J. A. Komon, San Diego, CA (US); Michael D. Wyrsta, Santa Barbara, CA (US)

(73) Assignee: Lixivia, Inc., Santa Barbara, CA (US)

( * ) Notice: Subject to any disclaimer, the term of this patent is extended or adjusted under 35 U.S.C. 154(b) by 46 days.

(21) Appl. No.: 16/146,720

(22) Filed: Sep. 28, 2018

(65) Prior Publication Data

US 2019/0032172 A1    Jan. 31, 2019

Related U.S. Application Data

(63) Continuation of application No. 15/087,559, filed on Mar. 31, 2016, now Pat. No. 10,113,215, which is a continuation of application No. 14/073,405, filed on Nov. 6, 2013, now Pat. No. 9,166,511.

(60) Provisional application No. 61/796,304, filed on Nov. 6, 2012.

(51) Int. Cl.
C22B 26/20    (2006.01)
C22B 3/16     (2006.01)

(52) U.S. Cl.
CPC ............ C22B 26/20 (2013.01); C22B 3/1625 (2013.01); *Y02P 10/234* (2015.11)

(58) Field of Classification Search
None
See application file for complete search history.

(56) References Cited

U.S. PATENT DOCUMENTS

| 5,939,034 | A | 8/1999 | Virnig et al. |
| 6,951,960 | B2 | 10/2005 | Perraud |
| 2004/0228783 | A1 | 11/2004 | Harris et al. |
| 2011/0039995 | A1 * | 2/2011 | Lohmeijer ............... C09D 7/62 |
| | | | 524/130 |

FOREIGN PATENT DOCUMENTS

| EP | 1309392 B1 | 7/2006 | |
| JP | 2005-097072 A | 4/2005 | |
| WO | WO-9425554 A1 * | 11/1994 | ......... C11D 3/0094 |
| WO | WO-9624434 A1 * | 8/1996 | ............ B01D 53/84 |
| WO | 2012-055750 A1 | 5/2012 | |
| WO | 2012-055750 A4 | 7/2012 | |

OTHER PUBLICATIONS

Kodama, Satoshi, et al., "Development of a New Ph-Swing CO2 Mineralization Process With a Recyclable Reaction Solution," Energy 33 (2008) 776-784, 9 pages.

* cited by examiner

*Primary Examiner* — Melissa S Swain
(74) *Attorney, Agent, or Firm* — Fish IP Law, LLP

(57) ABSTRACT

Hydrometallurgical systems, methods, and compositions are described in which organic amine-based lixiviants are utilized in the selective recovery of alkaline earth elements. The lixiviant can be regenerated and recycled for use in subsequent iterations of the process. Suitable lixiviant species include zwitterions, including zwitterion pairs that act as counterions to one another.

8 Claims, 5 Drawing Sheets

MAKING MINERAL SALTS FROM VARIOUS SOURCES

This application is a continuation of U.S. patent application Ser. No. 15/087,559, filed Mar. 31, 2016, which is a continuation of U.S. Pat. No. 9,347,111 filed on Nov. 6, 2013, which claims priority to U.S. Provisional Application No. 61/796,304, filed Nov. 6, 2012. These and all other referenced extrinsic materials are incorporated herein by reference in their entirety.

FIELD OF THE INVENTION

The field of the invention is hydrometallurgy, particularly as it is related to the extraction or recovery of alkaline earth elements.

BACKGROUND

The following description includes information that may be useful in understanding the present invention. It is not an admission that any of the information provided herein is prior art or relevant to the presently claimed invention, or that any publication specifically or implicitly referenced is prior art.

All publications identified herein are incorporated by reference to the same extent as if each individual publication or patent application were specifically and individually indicated to be incorporated by reference. Where a definition or use of a term in an incorporated reference is inconsistent or contrary to the definition of that term provided herein, the definition of that term provided herein applies and the definition of that term in the reference does not apply.

There is a long-standing need to efficiently and cost-effectively recover commercially valuable metals from low yield sources, such as mine tailings.

Historically, it has been especially desirable to recover alkaline earth elements. Alkaline earth elements, also known as beryllium group elements, include beryllium (Be), magnesium (Mg), calcium (Ca), strontium (Sr), barium (Ba) and radium, (Ra), which range widely in abundance. Applications of these commercially important metals also vary widely, and include uses as dopants in electronic components, structural materials, and in the production foods and pharmaceuticals.

Methods of isolating of one member of the alkaline earth family, calcium, from minerals such as limestone, have been known since ancient times. In a typical process limestone is calcined or otherwise roasted to produce calcium oxide (CaO), or quicklime. This material can be reacted with water to produce calcium hydroxide ($Ca(OH)_2$), or slaked lime. Calcium hydroxide, in turn, can be suspended in water and reacted with dissolved carbon dioxide ($CO_2$) to form calcium carbonate ($CaCO_3$), which has a variety of uses. Approaches that have been used to isolate other members of this family of elements often involve the production of insoluble hydroxides and oxides using elevated temperatures or strong acids. Such approaches, however, are not suitable for many sources of alkaline earth elements (such as steel slag), and are not sufficiently selective to be readily applied to mixtures of alkaline earth elements.

Hydrometallurgy can also been used to isolate metals from a variety of minerals, ores, and other sources. Typically, ore is crushed and pulverized to increase the surface area prior to exposure to the solution (also known as a lixiviant). Suitable lixiviants solubilize the desired metal, and leave behind undesirable contaminants. Following collection of the lixiviant, the metal can be recovered from the solution by various means, such as by electrodeposition or by precipitation from the solution.

Previously known methods of hydrometallurgy have several problems. Identification of lixiviants that provide efficient and selective extraction of the desired metal or metals has been a significant technical barrier to their adoption in the isolation of some metals. Similarly, the expense of lixiviant components, and difficulties in adapting such techniques to current production plants, has limited their use.

Approaches have been devised to address these issues. United States Patent Application No. 2004/0228783 (to Harris, Lakshmanan, and Sridhar) describes the use of magnesium salts (in addition to hydrochloric acid) as a component of a highly acidic lixiviant used for recovery of other metals from their oxides, with recovery of magnesium oxide from the spent lixiviant by treatment with peroxide. Such highly acidic and oxidative conditions, however, present numerous production and potential environmental hazards that limit their utility. In an approach disclosed in U.S. Pat. No. 5,939,034 (to Virnig and Michael), metals are solubilized in an ammoniacal thiosulfate solution and extracted into an immiscible organic phase containing guanidyl or quaternary amine compounds. Metals are then recovered from the organic phase by electroplating.

A similar approach is disclosed in U.S. Pat. No. 6,951,960 (to Perraud) in which metals are extracted from an aqueous phase into an organic phase that contains an amine chloride. The organic phase is then contacted with a chloride-free aqueous phase that extracts metal chlorides from the organic phase. Amines are then regenerated in the organic phase by exposure to aqueous hydrochloric acid. Application to alkaline earth elements (for example, calcium) is not clear, however, and the disclosed methods necessarily involve the use of expensive and potentially toxic organic solvents.

In a related approach, European Patent Application No. EP1309392 (to Kocherginsky and Grischenko) discloses a membrane-based method in which copper is initially complexed with ammonia or organic amines. The copper:ammonia complexes are captured in an organic phase contained within the pores of a porous membrane, and the copper is transferred to an extracting agent held on the opposing side of the membrane. Such an approach, however, requires the use of complex equipment, and processing capacity is necessarily limited by the available surface area of the membrane.

Methods for capturing $CO_2$ could be used to recover alkaline earth metals, but to date no one has appreciated that such could be done. Kodama et al. (Energy 33(2008), 776-784) discloses a method for $CO_2$ capture using a calcium silicate ($2CaO.SiO_2$) in association with ammonium chloride ($NH_4Cl$). This reaction forms soluble calcium chloride ($CaCl_2$), which is reacted with carbon dioxide ($CO_2$) under alkaline conditions to form insoluble calcium carbonate ($CaCO_3$) and release chloride ions (Cl—).

Kodama et al. uses clean forms of calcium to capture $CO_2$, but is silent in regard to the use of other alkaline earth elements in this chemistry. That makes sense from Kodoma et al.'s disclosure, which notes that a high percentage (approximately 20%) of the $NH_4Cl$ used is lost in the disclosed process, requiring the use of additional equipment to capture ammonia vapor. This loss results in significant process inefficiencies, and raises environmental concerns. Japanese Patent Application No. 2005097072 (to Katsunori and Tateaki) discloses a similar method for $CO_2$ capture, in which ammonium chloride ($NH_4Cl$) is dissociated into ammonia gas ($NH_3$) and hydrochloric acid (HCl), the HCl being utilized to generate calcium chloride ($CaCl_2$) that is mixed with ammonium hydroxide ($NH_4OH$) for $CO_2$ capture.

International Application WO 2012/055750 (to Tavakkoli et al) discloses a method for purifying calcium carbonate ($CaCO_3$), in which impure $CaCO_3$ is converted to impure calcium oxide (CaO) by calcination. The resulting CaO is treated with ammonium chloride ($NH_4Cl$) to produce calcium chloride ($CaCl_2$), which is subsequently reacted with high purity carbon dioxide ($CO_2$) to produce $CaCO_3$ and $NH_4Cl$, with $CaCO_3$ being removed from the solution by crystallization with the aid of seed crystals. Without means for capturing or containing the ammonia gas that would result from such a process, however, it is not clear if the disclosed method can be adapted to an industrial scale.

In some embodiments, the numbers expressing quantities of ingredients, properties such as concentration, reaction conditions, and so forth, used to describe and claim certain embodiments of the invention are to be understood as being modified in some instances by the term "about." Accordingly, in some embodiments, the numerical parameters set forth in the written description and attached claims are approximations that can vary depending upon the desired properties sought to be obtained by a particular embodiment. In some embodiments, the numerical parameters should be construed in light of the number of reported significant digits and by applying ordinary rounding techniques. Notwithstanding that the numerical ranges and parameters setting forth the broad scope of some embodiments of the invention are approximations, the numerical values set forth in the specific examples are reported as precisely as practicable. The numerical values presented in some embodiments of the invention may contain certain errors necessarily resulting from the standard deviation found in their respective testing measurements.

Unless the context dictates the contrary, all ranges set forth herein should be interpreted as being inclusive of their endpoints and open-ended ranges should be interpreted to include only commercially practical values. Similarly, all lists of values should be considered as inclusive of intermediate values unless the context indicates the contrary.

As used in the description herein and throughout the claims that follow, the meaning of "a," "an," and "the" includes plural reference unless the context clearly dictates otherwise. Also, as used in the description herein, the meaning of "in" includes "in" and "on" unless the context clearly dictates otherwise.

The recitation of ranges of values herein is merely intended to serve as a shorthand method of referring individually to each separate value falling within the range. Unless otherwise indicated herein, each individual value with a range is incorporated into the specification as if it were individually recited herein. All methods described herein can be performed in any suitable order unless otherwise indicated herein or otherwise clearly contradicted by context. The use of any and all examples, or exemplary language (e.g. "such as") provided with respect to certain embodiments herein is intended merely to better illuminate the invention and does not pose a limitation on the scope of the invention otherwise claimed. No language in the specification should be construed as indicating any non-claimed element essential to the practice of the invention.

Groupings of alternative elements or embodiments of the invention disclosed herein are not to be construed as limitations. Each group member can be referred to and claimed individually or in any combination with other members of the group or other elements found herein. One or more members of a group can be included in, or deleted from, a group for reasons of convenience and/or patentability. When any such inclusion or deletion occurs, the specification is herein deemed to contain the group as modified thus fulfilling the written description of all Markush groups used in the appended claims.

Thus, there is still a need for a hydrometallurgical method that provides simple and economical isolation of metal hydroxide forming species.

SUMMARY OF THE INVENTION

The inventive subject matter provides apparatus, systems and methods in which an organic amine cation/counterion anion complex is used as a lixiviant for extracting metals from metal hydroxide forming species.

The organic amine cation/counterion anion complex transfers counterions to metal hydroxides, generating soluble metal hydroxide forming species/counterion complexes (i.e., metal salts) and uncharged amines. The organic amine cation/counterion anion complex can be regenerated by the addition of an acid. The organic amine component of the organic amine cation/counterion anion complex can be chosen to provide selective solubilization of a second metal hydroxide forming species.

One category of embodiments of the inventive concept comprises method for extracting metal hydroxide forming species in which a sample is mixed or otherwise contacted with a lixiviant that contains an organic amine in the form of an organic amine cation paired with a counterion. The lixiviant is preferably formed by adding an acid to an uncharged organic amine that is in contact with the sample. Any suitable organic amine can be used, but preferably is selected to have a pKa between about 8 and about 14. The organic amine can be obtained from any suitable source, including a biological source. In this category of embodiments, a supernatant is formed that includes a soluble metal hydroxide forming species cation complexed with the counterion and uncharged organic amine. The metal hydroxide forming species can then be transferred or recovered from the supernatant in any suitable manner, including for example one or more of filter press techniques, centrifugation, evaporation of the solvent, magnetic separation and settling. In general, it is desirable to regenerate the organic amine cation, which can be accomplished by adding a suitable acid. During regeneration of the organic amine cation, the pH is generally weakly acidic (typically having a pH between about 6 and about 7.

Another category of embodiments of the inventive concept comprises methods that use multiple lixiviants to extract multiple metal hydroxide forming species. In this category, a first supernatant and a depleted sample are formed when a first lixiviant contacts a sample comprising a first metal hydroxide species and a second metal hydroxide forming species. The first supernatant includes an uncharged first organic amine and a first complex comprising a first metal hydroxide forming species cation and a first counterion. The first metal hydroxide forming species cation is then transferred from the supernatant to form a depleted sample. The depleted sample is contacted with a second lixiviant, which includes a second organic amine cation and a second counterion, to form a second supernatant. The second supernatant includes an uncharged second organic amine and a second complex comprising a second metal hydroxide forming species cation and a second counterion. The first organic amine cation and the second organic amine cation is regenerated via the addition of an acid.

In yet another category of embodiments of the inventive concept, one lixiviant are used to extract two different metal hydroxide forming species. In this category, a sample containing two or more different metal hydroxide forming species is contacted with a lixiviant that includes a first organic amine cation, a second organic amine cation, and a counterion. The resulting supernatant includes an uncharged first organic amine, an uncharged second organic amine, a first complex (i.e., a first metal hydroxide forming species cation complexed with a counterion) and a second complex (i.e., a second metal hydroxide forming species cation complexed with a counterion). The first metal hydroxide forming species cation from the first supernatant is recovered to form a second supernatant. The second metal hydroxide forming species cation is then recovered from this second supernatant. Finally, the first organic amine cation and the second organic amine cation are regenerated from second supernatant via the addition of an acid.

Various objects, features, aspects and advantages of the inventive subject matter will become more apparent from the following detailed description of preferred embodiments, along with the accompanying drawing figures in which like numerals represent like components.

DETAILED DESCRIPTION

Figure 1:
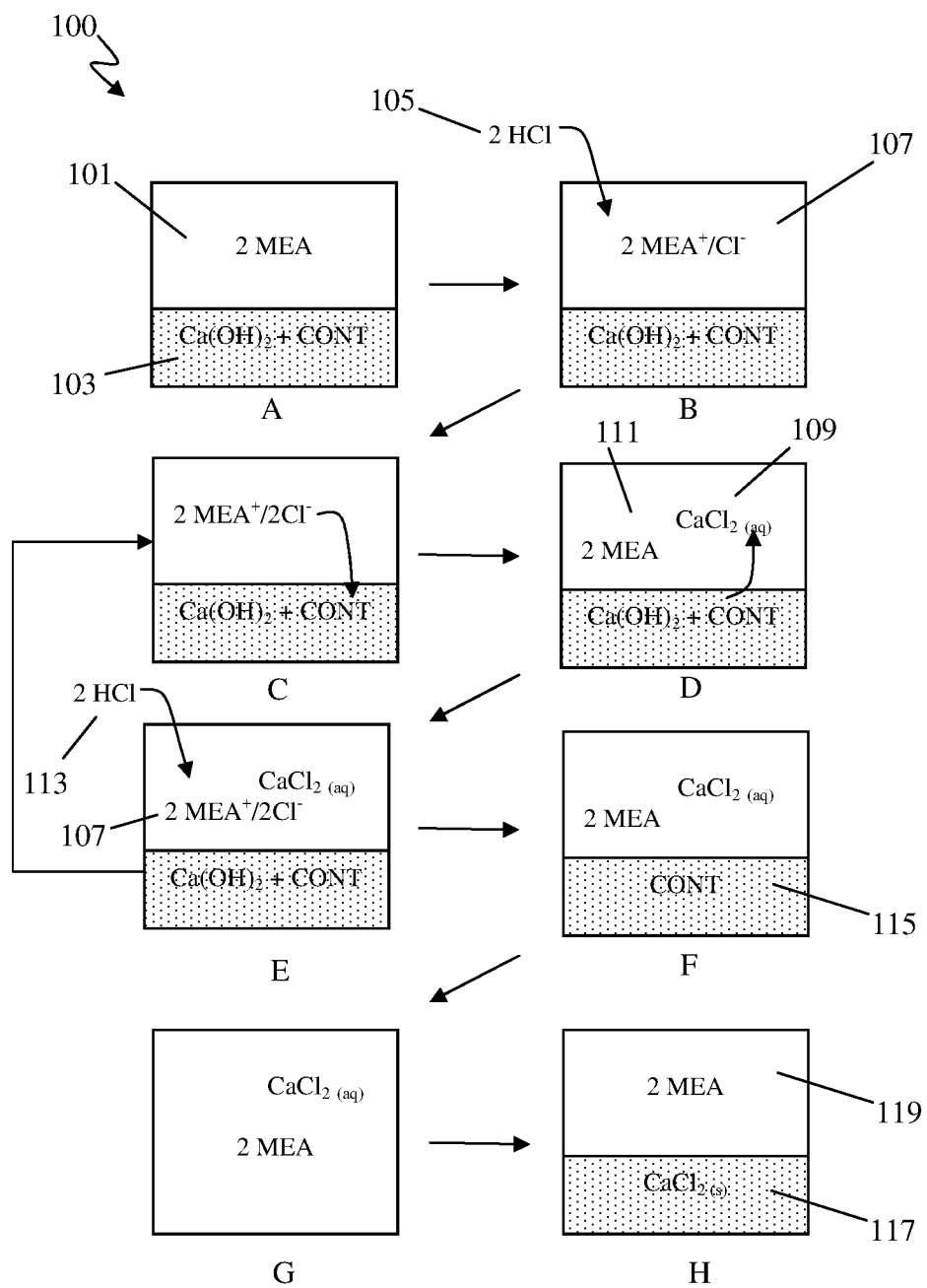
FIG. 1 depicts an example of a multi-step method of the inventive concept in which calcium is recovered from a sample, using an organic amine chloride lixiviant that is regenerated. Individual steps are designated from A to H. Step A depicts contacting monoethylamine (MEA) with a solid raw material containing $Ca(OH)_2$ and contaminants (CONT). Step B depicts generate of MEA+/Cl— by addition of an acid. Step C depicts entry of the MEA+/Cl— into the raw material. Step D depicts the formation of soluble $CaCl_2$ and generation of MEA. Step E depicts formation of additional MEA+/Cl— by the addition of acid, which can result in additional extraction of remaining $Ca(OH)_2$ by cycling through steps C and D. Step F depicts the reaction when essentially all available Ca has been extracted from the raw material in the form of $CaCl_2$. Step G depicts recovery of a supernatant that includes MEA and soluble $CaCl_2$ from the results of Step F. Step H shows recovery of the solubilized Ca as a solid, with recovery of MEA in a form suitable for recycling into the process.

Throughout the following discussion, numerous references will be made regarding lixiviants. As used herein, the term "lixiviant" means a chemical entity disposed in an aqueous or other solvent, which has the ability to selectively extract metals or metal ions from inorganic or organic solids. Also as used herein, the term organic amine encompasses ammonia and ammonia derivatives in addition to nitrogen containing organic compounds.

The following discussion provides many exemplary embodiments of the inventive subject matter. Although each embodiment represents a single combination of inventive elements, the inventive subject matter is considered to include all possible combinations of the disclosed elements. Thus if one embodiment comprises elements A, B, and C, and a second embodiment comprises elements B and D, then the inventive subject matter is also considered to include other remaining combinations of A, B, C, or D, even if not explicitly disclosed.

As used herein, and unless the context dictates otherwise, the term "coupled to" is intended to include both direct coupling (in which two elements that are coupled to each other contact each other) and indirect coupling (in which at least one additional element is located between the two elements). Therefore, the terms "coupled to" and "coupled with" are used synonymously.

Inventors have discovered a hydrometallurgical method for the recovery of metal hydroxide forming species (e.g., alkaline earth metals) through the use of organic amine-containing lixiviants. In addition, inventors have determined that such organic amine-containing lixiviants can be regenerated during and/or after processing, permitting the organic amines to act in a pseudocatalytic manner. This pseudocatalytic behavior allows the organic amines to be applied in sub stoichiometric amounts.

As used herein, the term "metal hydroxide forming species" means a metal from the alkaline earth metals, the rare earth metals, actinides, transition metals and all elements in groups 3-12 of the periodic table, which can be hydrated to form $M(OH)_x$. Embodiments of the inventive process react (a) at least one compound of composition 1 and (b) a source containing a metal hydroxide forming species with a lixiviant to extract the metal hydroxide forming species. Metal hydroxide forming species can be present as oxides (e.g., calcium oxide (CaO)), which can form hydroxides on reaction with water. Such hydrated forms may be present in the material as it is obtained from nature or can be introduced by processing (for example through treatment with a base or by oxidation), and can be stable or transient. Selective extraction of the desired metal hydroxide forming species can be based on the presence of a metal hydroxide that has a stronger basicity than the organic amine-based lixiviants used in the extraction process.

Organic amines of the inventive concept have the general formula in Composition 1, where N is nitrogen, H is hydrogen, and X is a counterion (i.e., counter anion).

$N_y, R_1, R_2, R_3, H\text{-}X_z$           Composition 1

An example of an organic amine that conforms to Composition 1 is ammonium chloride ($NH_4Cl$), which has R1, R2, R3, H as hydrogen and one counterion ($X_z$) as a chloride ($Cl^-$). Ammonium chloride, when dissolved in water or another suitable solvent, can effectively extract hydrated calcium hydroxide. Quaternary ammonium compounds are often stronger bases, but are difficult to use because they do not have a clear path for regeneration.

Compounds having the general formula shown in Composition 1 can have a wide range of acidities. An organic amine of the inventive concept can be selected on the basis of its acidity so that it can selectively react with one or more different metal oxides from a sample containing a mixture of metal hydroxide forming species.

Suitable counterions can be any form or combination of atoms or molecules that produce the effect of a negative charge. Counterions can comprise halides (e.g., fluoride, chloride, bromide, and iodide), anions derived from mineral acids (e.g., nitrate, phosphate, bisulfate, sulfate, silicates), anions derived from organic acids (e.g., carboxylate, citrate, malate, acetate, thioacetate, propionate and, lactate), organic molecules or biomolecules (e.g., acidic proteins or peptides, amino acids, nucleic acids, and fatty acids), and others (e.g., zwitterions and basic synthetic polymers). In addition, it is contemplated that in the case of certain amino acids (e.g., glycine, alanine, threonine), they are themselves the counterion. Therefore, such amino acids may not need to be acid charged.

Suitable organic amines for the production of metal salts from converter steel slag and other materials can have a pKa of about 7 or about 8 to about 14, and can include protonated ammonium salts (i.e. not quaternary). Such organic amines include ammonia, nitrogen containing organic compounds (e.g., monoethanolamine, diethanolamine, triethanolamine, morpholine, ethylene diamine, diethylenetriamine, triethylenetetramine, methylamine, ethylamine, propylamine, dipropylamines, butylamines, diaminopropane, triethylamine, dimethylamine, and trimethylamine), low molecular weight biological molecules (e.g., glucosamine, amino sugars, tetraethylenepentamine, amino acids, polyethyleneimine, spermidine, spermine, putrecine, cadaverine, hexamethylenediamine, tetraethylmethylene-diamine, polyethyleneamine, cathine, isopropylamine, and a cationic lipid), biomolecule polymers (e.g., chitosan, polylysine, polyornithine, polyarginine, a cationic protein or peptide), and others (e.g., a dendritic polyamine, a polycationic polymeric or oligomeric material, and a cationic lipid-like material), or combinations of these.

Such organic amines can also range in purity from about 50% to about 100%. For example, an organic amine of the inventive concept can have a purity of about 50%, about 55%, about 60%, about 65%, about 70%, about 75%, about 80%, about 85%, about 90%, about 95%, about 97%, about 99%, or about 100%. In a preferred embodiment of the inventive concept the organic amine is supplied at a purity of about 90% to about 100%. It should be appreciated that such organic amines can differ in their ability to interact with different members of metal hydroxide forming species and with contaminating species, and that such selectivity can be utilized in the recovery of multiple alkaline earths as described below.

Inventors further contemplate that zwitterionic species can be suitable lixiviants, and note that such zwitterionic species can form cation/counterion pairs with two members of the same or of different molecular species. Examples include amine containing acids (e.g., amino acids and 3-aminopropanoic acid), chelating agents (e.g., ethylenediaminetatraacetic acid and salts thereof, ethylene glycol tetraacetic acid and salts thereof, diethylene triamine pentaacetic acid and salts thereof, and 1,2-bis(o-aminophenoxy)ethane-N,N,N',N'-tetraacetic acid and salts thereof), and others (for example betaines, ylides, and polyaminocarboxylic acids).

It is notable that the use of biologically derived organic amines is a sustainable practice, and has the beneficial effect of making this process more environmentally sound. In addition, it should be appreciated that some organic amines, such as monoethanolamine, have a reduced tendency to volatilize during processing than other organic amines, such as ammonia. In some embodiments of the inventive concept, an organic amine can be a low volatility organic amine (i.e. having a vapor pressure less than or equal to about 1% that of ammonia under process conditions). In other embodiments of the inventive concept an organic amine can be a non-volatile organic amine (i.e. having a vapor pressure less than or equal to about 0.1% that of ammonia under process conditions). Capture and control of such low volatility and non-volatile organic amines requires relatively little energy and can utilize simple equipment. This reduces the likelihood of such low volatility and non-volatile organic amines escaping into the atmosphere and advantageously reduces the environmental impact of their use.

Equation 1 depicts a primary chemical reaction in extracting a metal hydroxide forming species (M) from a matrix using an organic amine cation (OA-H$^+$)/counterion (Cl$^-$) complex (OA-H$^+$/Cl$^-$) as a lixiviant.

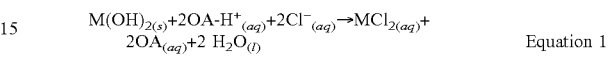

$$M(OH)_{2(s)} + 2OA\text{-}H^+_{(aq)} + 2Cl^-_{(aq)} \rightarrow MCl_{2(aq)} + 2OA_{(aq)} + 2H_2O_{(l)} \quad \text{Equation 1}$$

The counterion (Cl$^-$) is transferred from the organic amine cation (OA-H$^+$) to the metal salt to form a soluble metal/counterion complex (MCl$_2$), an uncharged organic amine (OA), and water. One can use substantially less than stoichiometric amounts of the lixiviant to recover all of the desired extractable active metal species as a soluble salt.

The organic amine cation (OA-H$^+$) can be regenerated by any suitable means. For example, acid can be added to protonate the organic amine (OA) so that the organic amine cation is regenerated, as shown in Equation 2. It is contemplated that acids used for the regeneration of the organic amine cation include mineral acids (e.g., hydrochloric acid, nitric acid, phosphoric acid, etc.) and organic acids (e.g., acetic acid, formic acid, citric acid, etc.).

$$OA_{(aq)} + H^+_{(aq)} \rightarrow OA\text{-}H^+_{(aq)} \quad \text{Equation 2}$$

The reaction rate is much greater than direct contact of acid with solid metal or metal oxide/hydroxide because the protonation of the amine occurs in the solution phase. The regenerated lixiviant (OA-H$^+$/Cl$^-$) will then undergo selective reaction with the metal hydroxide forming species according to Equation 1. In this manner, the metal hydroxide forming species can selectively be extracted from waste material via the reactions in Equation 1 and Equation 2 until all the metal hydroxide forming species is consumed or addition of acid is ceased. Extent of reaction can be measured by monitoring pH of the reacting solution.

The soluble metal salt (MCl$_2$) and the soluble organic amine (OA) from Equation 1 (or soluble organic amine cation if the reaction is metal oxide/hydroxide limited), can easily be separated from the insoluble matrix residue. Once separated, the soluble aqueous fraction can be used as-is if the target process can tolerate the small quantity of organic amine as a contaminant or the solution can be furthered processed as needed.

The soluble metal salt (MCl$_2$) and the soluble organic amine (OA) solution could also be concentrated or diluted to a desired strength as required by the end user. Alternatively, the solution could be boiled down completely, leaving the metal salt and/or various hydrates thereof, depending on how vigorously the mixture is dried. The residual organic amine could also be removed by this process and optionally captured for reuse. The dried metal salt would be suitable for use as a desiccant.

If higher purity product is desired, the metal salt can be concentrated and/or cooled to crystalize out specific hydrates of the metal salt. After separation of the supernatant, the crystalline material can be used as intended and the solution could be further concentrated to yield more hydrated calcium chloride, or recycled back to the extraction process.

An example of an application of the inventive concept is in the extraction of calcium from an insoluble calcium hydroxide in steel slag by using an ammonium chloride lixiviant. Equation 3 represents a reaction that takes on contacting calcium hydroxide ($Ca(OH)_2$)-containing steel slag with an ammonium chloride lixiviant where calcium is extracted from the slag as soluble calcium chloride ($CaCl_2$), with the generation of uncharged ammonia and water.

$$Ca(OH)_{2(s)} + 2NH_4^+{}_{(aq)} + 2Cl^-{}_{(aq)} \rightarrow CaCl_{2(aq)} + 2 NH_{3(aq)} + 2 H_2O_{(l)} \quad \text{Equation 3}$$

When first starting the process, either the ammonium salt or unprotonated ammonia may be used. Subsequently, once the lixiviant has transferred its anion, fresh acid should be added to satisfy the protonation of the amine so that further metal salt can be produced, as shown in Equation 4.

$$NH_{3(aq)} + H^+{}_{(aq)} \rightarrow NH_4^+{}_{(aq)} \quad \text{Equation 4}$$

The regenerated lixiviant will undergo selective reaction with calcium hydroxide according to Equation 3. In this manner, calcium can selectively be extracted from waste material via the reactions in Equation 3 and Equation 4 until all the calcium hydroxide is consumed or addition of acid is ceased.

It should be appreciated that the lixiviant allows for the selective extraction of calcium in this example because it does not react with other metals or metal oxides/hydroxides in the steel slag (e.g., iron does not react with the lixiviant, Equation 5). Whereas, in the absence of lixiviant, the acid will react non-selectively with iron (Equation 6) and calcium hydroxide (Equation 7) as well as other potential metal oxides/hydroxides. The lixiviant, when used in this pseudo-catalytic manner, acts as a proton shuttle allowing for the selective reaction with, in this example but not limited to, calcium hydroxide. The end result is that the net reaction, when Equation 3 and Equation 4 are combined, is Equation 7, whereas in the absence of the lixiviant, Equation 7 cannot proceed without Equation 6 also occurring.

$$Fe^0{}_{(s)} + NH4^+{}_{(aq)} \rightarrow \text{NO REACTION} \quad \text{Equation 5}$$

$$2Fe^0{}_{(s)} + 6H^+{}_{(aq)} \rightarrow 2Fe^{3+}{}_{(aq)} + 3H_{2(g)} \quad \text{Equation 6}$$

$$Ca(OH)_{2(s)} + 2H^+{}_{(aq)} \rightarrow Ca^{2+}{}_{(aq)} + 2H_2O_{(l)} \quad \text{Equation 7}$$

As noted above, in some instances the use of a low volatility and/or non-volatile lixiviant is desirable. An example of such a process of the inventive concept is the extraction of calcium in converter slag from steel production using a non-volatile organic amine, such as monoethanolamine hydrochloride, as shown in FIG. 1.

FIG. 1 shows a process where individual steps are designated A to H. Step A of FIG. 1 shows a tank 100 or other suitable arrangement that includes an aqueous solution of an organic amine 101 (in this instance monoethanolamine) and a mud or slurry 103 containing calcium hydroxide ($Ca(OH)_2$) and unwanted contaminants (CONT). In this example, water is used to dissolve the lixiviant, but other solvents can be used. Examples of suitable solvents include glycerol, glycols, water glycerol mixtures, alcohols, polymers, and surfactants. The amount of organic amine utilized can be optimized for efficient alkaline earth extraction and minimal use of organic amine. For example, in some embodiments, the amount of a monovalent organic amine can be selected to be at least about twice that of the available alkaline earth element. In other embodiments of the inventive concept, the amount of a monovalent organic amine can be selected to be at least about 0.05 times or about 1.1 times that of the available alkaline earth element. Amounts of organic amines with greater charges can be adjusted accordingly (for example, an organic amine that forms a divalent cation can be used in at least a 1:1 ratio with the available alkaline earth element).

Reaction conditions can also be optimized by adjusting the available surface area available for the reaction. Particle size of the calcium containing raw material can be reduced prior to exposure to lixiviant, for example by grinding, milling, or sifting. In some embodiments of the inventive concept, the particle size can range from about 0.05 mm to about 1 mm. In other embodiments of the inventive concept, the particle size can range from about 0.05 to about 0.25 mm. In a preferred embodiment, the particle size can range from about 0.05 mm to about 0.125 mm. The calcium content of the solution can be adjusted to provide efficient extraction. In some embodiments of the inventive concept, the Ca content is controlled such that the mass ratio of Ca (in terms of CaO to water) can range from about 0.02 to about 0.5. In other embodiments, the mass ratio of Ca can range from about 0.05 to about 0.25. In a preferred embodiment of the inventive process, the mass ratio of Ca can range from about 0.1 to about 0.15.

The extraction process can be initiated as shown in step B of FIG. 1 by the addition of an acid form of a counterion 105, in this instance hydrochloric acid (HCl), which generates an organic acid cation/counterion pair 107 (monoethanolamine hydrochloride ($MEA^+/Cl^-$)). Monoethanolamine hydrochloride (MEA.HCl, $HOC_2H_4NH_3Cl$) conforms to Composition 1 as follows: one nitrogen atom ($N_1$) is bound to one carbon atom ($R_1 = C_2H_5O$) and 3 hydrogen atoms ($R_2$, $R_3$ and H), and there is one chloride counteranion ($X_1 = Cl^-$). The extraction process can be performed at any suitable temperature. In some embodiments of the inventive concept, the extraction can be performed in a temperature range of about 0° C. to about 120° C. In other embodiments of the inventive concept, the extraction can be performed within a temperature range of about 20° C. to about 100° C.

When dissolved in water or another suitable solvent, monoethanolamine hydrochloride can enter or mix with the mud/slurry (as shown in step C of FIG. 1) and effectively extract (as shown in step D of FIG. 1) an alkaline earth hydroxide (e.g., calcium hydroxide) by the formation of a soluble alkaline earth cation/counterion pair 109 (in this instance, calcium chloride ($CaCl_2$)). Equation 8 depicts the reaction in such an extraction (calcium from steel slag that contains contaminants). Note that MEA.HCl dissociates in water into monoethanolammonium cation ($HOC_2H_4NH_3^+$ ($MEAH^+$)) and chloride anion ($Cl^-$).

$$Ca(OH)_{2(s)} + 2HOC_2H_4NH_3^+{}_{(aq)} + 2Cl^-{}_{(aq)} \rightarrow CaCl_{2(aq)} + 2 HOC_2H_4NH_{2(aq)} + 2 H_2O_{(l)} \quad \text{Equation 8}$$

The reaction can be stirred during the extraction process in order to improve reaction kinetics. In some embodiments, stirrer speeds can range from about 100 rpm to about 2000 rpm; in other embodiments of the inventive concept, stirrer speeds can range from about 200 rpm to about 500 rpm.

As illustrated in step D of FIG. 1, this process also generates an uncharged organic amine 111 (MEA). The soluble fraction or supernatant, which contains soluble alkaline earth cation/counterion pair 109, can be separated from the unreacted contaminants. However, more lixiviant can also be regenerated (as shown in step E of FIG. 1) by a second addition of an acid form of a counterion 113, in this instance hydrochloric acid (HCl), which regenerates the organic acid cation/counterion pair 107 ($MEAH^+/Cl^-$) by protonating the uncharged organic amine 111. Equation 9 depicts the regeneration of MEAH⁺ lixiviant by protonation of MEA.

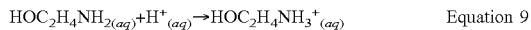

$$HOC_2H_4NH_{2(aq)} + H^+_{(aq)} \rightarrow HOC_2H_4NH_3^+_{(aq)} \quad \text{Equation 9}$$

The regenerated organic acid cation/counterion pair 107 enters or mixes with the mud/slurry (as shown in step C of FIG. 1) and extracts (as shown in step D of FIG. 1) additional alkaline earth hydroxide (e.g., calcium hydroxide) by the formation of a soluble alkaline earth cation/counterion pair 109.

As with the previous example (ammonium chloride lixiviant), the lixiviant allows for the selective extraction of calcium because it does not react with other metals or metal oxides/hydroxides in the steel slag (e.g., iron does not react with the lixiviant, Equation 10). Whereas, in the absence of lixiviant, the acid will react non-selectively with iron (Equation 6) and calcium hydroxide (Equation 7) as well as other potential metal oxides/hydroxides.

$$Fe^0_{(s)} + HOC_2H_4NH_3^+_{(aq)} \rightarrow \text{NO REACTION} \quad \text{Equation 10}$$

Once all the calcium hydroxide is consumed or addition of acid is ceased, the soluble fraction or supernatant, which contains soluble alkaline earth cation/counterion pair 109, can be separated from the unreacted contaminants 115 (as shown in step F of FIG. 1). Separation can be accomplished by any suitable method (e.g., decanting, pumping, or siphoning, filtration, centrifugation, or a combination of these) to remove the supernatant from the unreacted contaminants 115.

Once separated, the soluble aqueous fraction (as shown in step G of FIG. 1) can be used as-is if the target process can tolerate the small quantity of organic amine as a contaminant. The soluble metal salt ($CaCl_2$) and the soluble organic amine (MEA) solution could also be concentrated or diluted to a desired strength as required by the end user. Alternatively, the solution could be boiled down completely (as shown in step H of FIG. 1), leaving the metal salt 117 and/or various hydrates thereof. The residual organic amine 119 could be recycled in an earlier step in the process (e.g., recycled into the tank shown in step B of FIG. 1).

There are of course many possible lixiviants of the form of Composition 1, and there are likewise many alkaline earth element sources. While the examples provided have described the reaction of two organic amine lixiviants (ammonium chloride and monoethanolamine hydrochloride) with one particular calcium source (steel converter slag), other embodiments of the inventive concept can utilize different organic amine cation/counterion pairs (e.g., ammonium acetate, monoethanolammonium acetate, ammonium nitrate, or monoethanolammonium nitrate). Alternatively, biologically derived lixiviants such as the amino acid glycine (or a salt of itself) or the hydrobromide salt of poly-L-lysine can be used.

Similarly, while examples note the use of steel slag, other sources (such as lime, cement kiln dust, fly ash, municipal waste ash, other types of steel slag, or fluid bed ash) are suitable. Alternatively, systems, methods, and compositions of the inventive concept can be utilized to recover metal hydroxide forming species from agricultural waste, consumer waste, industrial waste, scrap or other excess materials from manufacturing processes, or other post-utilization sources.

It should also be noted that systems, methods, and compositions of the inventive concept are not limited to one metal hydroxide forming species being extracted with one particular lixiviant or set of anions. Multiple metal hydroxide forming species with various organic amine based lixiviants and various anions (or acids) can be used in sequence or in parallel to extract a particular mixture of metals or to produce a particular mixture of metal salts.

As described above, lixiviants of the inventive concept can be applied in a variety of methods. Examples of some of these methods are depicted schematically in FIG. 2, FIG. 3, and FIG. 4.

Figure 2:
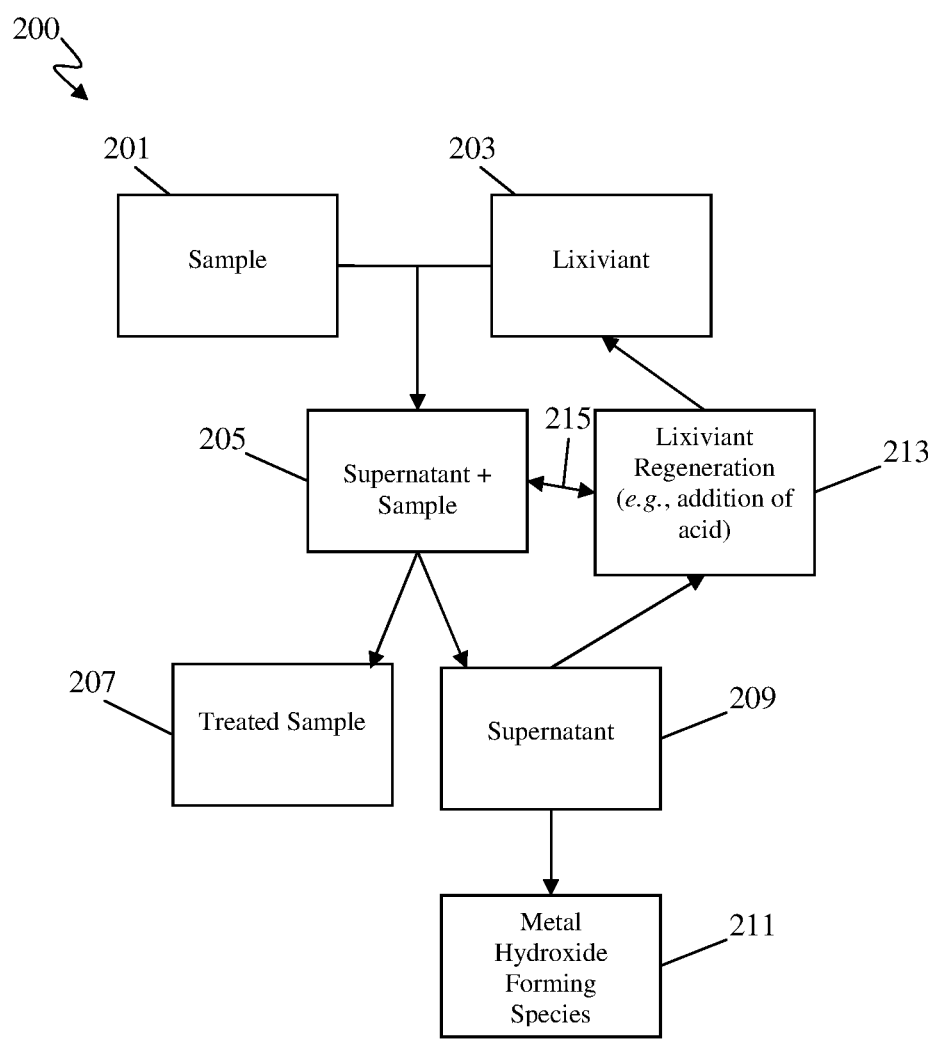
FIG. 2 schematically depicts a method of the inventive concept, in which metal hydroxide forming species are recovered from a sample using a lixiviant, which is regenerated.

FIG. 2 depicts a method of the inventive process 200 in which a sample 201, such as an ore, mineral, or other source of metal hydroxide forming species, is mixed with a lixiviant 203. The lixiviant can include one or more organic amine species as described above (Composition 1) in the form of a cation coupled with a suitable counterion. Suitable counterions can include halides. In a preferred embodiment of the inventive concept the counterion is chloride ($Cl^-$). Sample 201 can be a calcium-containing ore (e.g., dolomite or gypsum), a byproduct of a manufacturing process (for example, steel slag), or any suitable calcium source, including the lime form of dolomite (dolomitic lime).

Sample 201 can be treated prior to mixing with lixiviant 203. For example, the components of the sample 201 can be reduced in size through milling, grinding, pulverizing, or sifting. Such processes improve the surface area to volume ratio of elements of the sample and can serve to increase reaction rates. In some embodiments, a sample can be chemically treated, for example, through exposure to strong bases (such as sodium hydroxide) or oxidized through exposure to air at elevated temperatures. Such chemical treatments can serve to generate metal salts (for example, hydroxides or oxides) and to alter the physical structure of the sample or components of the sample.

On interacting with lixiviant 203, metal hydroxide forming species in the sample form a soluble metal element cation/counterion complex that is solubilized in the supernatant 205, along with an uncharged organic amine. The pH of this portion of the reaction process can be alkaline, i.e. ranging from about 7.5 to about 14. In some embodiments of the inventive concept the pH can range from about 10 to about 12. Unwanted contaminants are not solvated, and remain behind as insoluble material as a treated sample 207 that can be further processed if desired.

The supernatant 209 can be separated from the insoluble materials of the treated sample 207 by a variety of processes, including settling, filtration, or centrifugation, either alone or in combination. Thereafter, the metal hydroxide forming species 211 can be recovered as a metal salt from the supernatant 209 by any suitable means, including filtration, centrifugation, magnetic separation, electrodeposition, evaporation of the solvent, precipitation, and ion exchange.

The uncharged organic amine remaining in the supernatant 209 can, in turn, be regenerated 213 (via addition of acid) in this process to form an organic amine cation that can form part of lixiviant 203 that can be used in the next iteration of the reaction. In a preferred embodiment of the inventive concept, an acidic form of the counterion can be added to the mixed supernatant and sample 205 to regenerate the charged organic amine/counterion pair in situ 215. This recycling of the lixiviant greatly reduces consumption through multiple cycles of the process and advantageously reduces environmental impact and expense.

Figure 3:
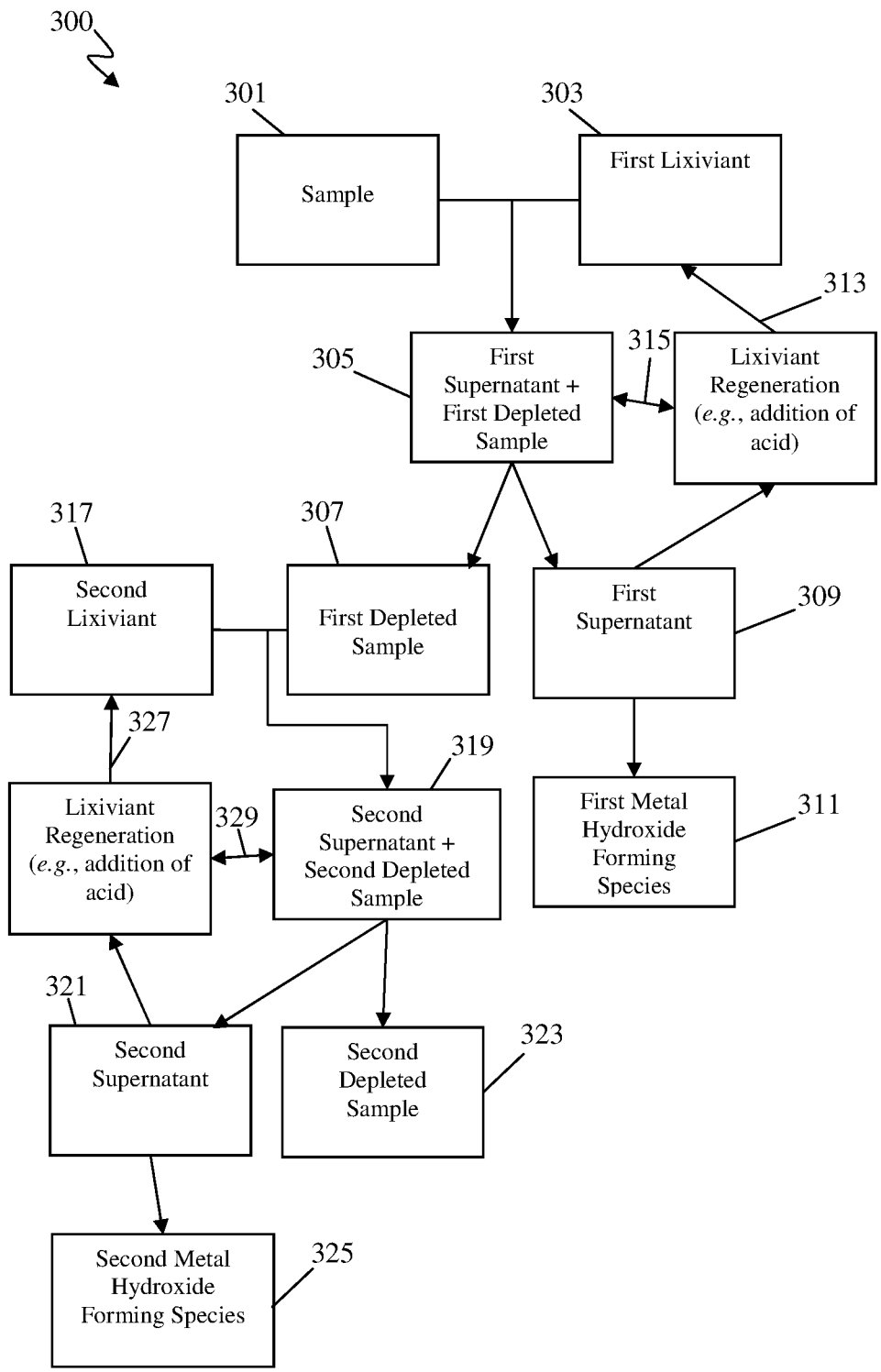
FIG. 3 schematically depicts another method of the inventive concept, in which different metal hydroxide forming species are recovered in a stepwise fashion.

Other embodiments of the inventive concept can advantageously utilize the selective complex formation and solubility of components of methods of the inventive concept to recover different metal hydroxide forming species from the same sample. One example of such a method is shown in FIG. 3. As shown, such a method can be a chain of reactions that are, essentially, one or more repetitions of the method shown in FIG. 2 applied to a progressively depleted sample. In an example of such a method 300, a sample 301 and a first lixiviant 303 are brought into contact with each other to produce a first supernatant and a first depleted sample 305. The first lixiviant 303 includes a first organic amine cation and a counterion, and reaction 305 and the first supernatant 309 includes a first metal hydroxide forming species cation, a counterion, and an uncharged organic amine.

The first depleted sample 307 includes materials that were not reactive with the first lixiviant, which can include additional metal hydroxide forming species, other valuable materials, and unwanted contaminants. It can be separated from the first supernatant 309 by any suitable method, including settling, filtration, and centrifugation, either alone or in combination. The first metal hydroxide forming species 311 can be recovered from the first supernatant 309 as a metal salt by any suitable means, including electrodeposition, evaporation of the solvent, precipitation, and ion exchange. In a preferred embodiment of the inventive concept, an acidic form of the counterion can be added to the mixed first supernatant and first depleted sample 305 to regenerate the charged first organic amine/counterion pair in situ 315. The regenerated first organic amine/counterion pair can in turn be recycled 313 for use in the next iteration of the process.

The first depleted sample 307 can be contacted with a second lixiviant 317, which includes a second organic amine cation/counterion pair. Reaction with the first depleted sample 307 produces a second depleted sample and a second supernatant 319 that includes a soluble second metal hydroxide forming species cation/counterion complex and uncharged second organic amine. The second metal hydroxide forming species can be recovered from the second supernatant 321 as a metal salt by any suitable means, including precipitation, electrodeposition, and/or ion exchange. Similar to that of the above, an acidic form of the counterion can be added to the mixed second supernatant and second depleted sample 319 to regenerate the charged second organic amine/counterion pair in situ 329.

In other embodiments of the inventive concept the first acid and the second acid for regeneration of the lixiviant are different species. Additionally, the second depleted sample 323 can be subjected to further rounds of treatment with lixiviants in order to recover additional valuable materials. Finally, it is contemplated that the lixiviants can advantageously be recycled to reduce the overall amount of organic amines used as the process is repeated to limit the environmental impact of such operations and permit considerable savings in materials.

Figure 4:
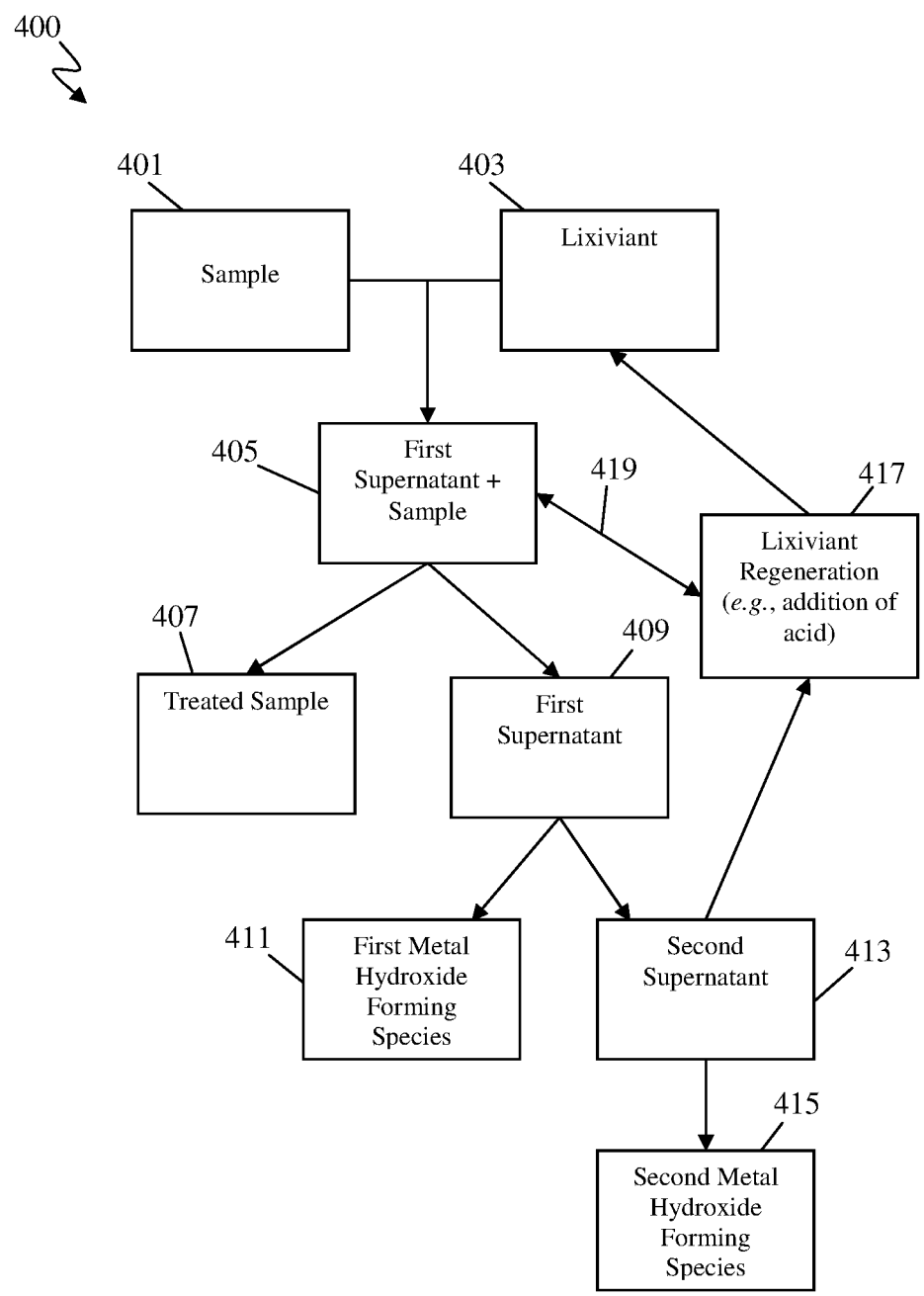
FIG. 4 schematically depicts an alternative embodiment of the inventive concept, in which different metal hydroxide forming species are recovered in a stepwise manner.

Another embodiment of the inventive concept that permits recovery of two or more metal hydroxide forming species from a sample is shown in FIG. 4. In such a method 400, a sample 401 is contacted with a lixiviant 403 that includes a first organic amine cation/counterion pair and a second organic amine cation/counterion pair. This mixture 405 results in a treated sample 407 and a first supernatant 409. This first supernatant typically includes a first metal hydroxide forming species cation/counterion pair, a second metal hydroxide forming species cation/counterion pair, a first uncharged organic amine, and a second uncharged organic amine. The first metal hydroxide forming species 411 can be recovered from the first supernatant 409 by any suitably selective means, including precipitation, evaporation of the solvent, electroplating, or ion exchange.

Recovery of the first metal hydroxide forming species 411 from the first supernatant 409 yields a second supernatant 413, which includes a second metal hydroxide forming species cation/counterion pair, an uncharged first organic amine, and an uncharged second organic amine. The second metal hydroxide forming species cation 415 can be recovered from the second supernatant 413 by any suitable means, such as precipitation (for example, through treatment with additional amounts of a base that forms a salt), evaporation of the solvent, electrodeposition, or ion exchange. Following extraction of the second metal hydroxide forming species, the second supernatant 413 can be treated (for example, by the addition of an acid form of the counterion) to regenerate the lixiviant 417.

It should be appreciated that, as described in the processes illustrated in FIG. 2 and FIG. 3, that an acid form of the counterion can be added to the mixtures of lixiviant and sample to regenerate the first organic amine cation, the second organic amine cation, or both the first and second organic amine cations in situ 419. This permits the first organic amine cation, the second organic amine cation, or both to act as pseudocatalysts and function in substoichiometric quantities. In addition, the use of the organic amine in substoichiometric amounts relative to the metal hydroxide forming species of the sample limits both the environmental impact of such operations and permits considerable savings in materials.

Figure 5:
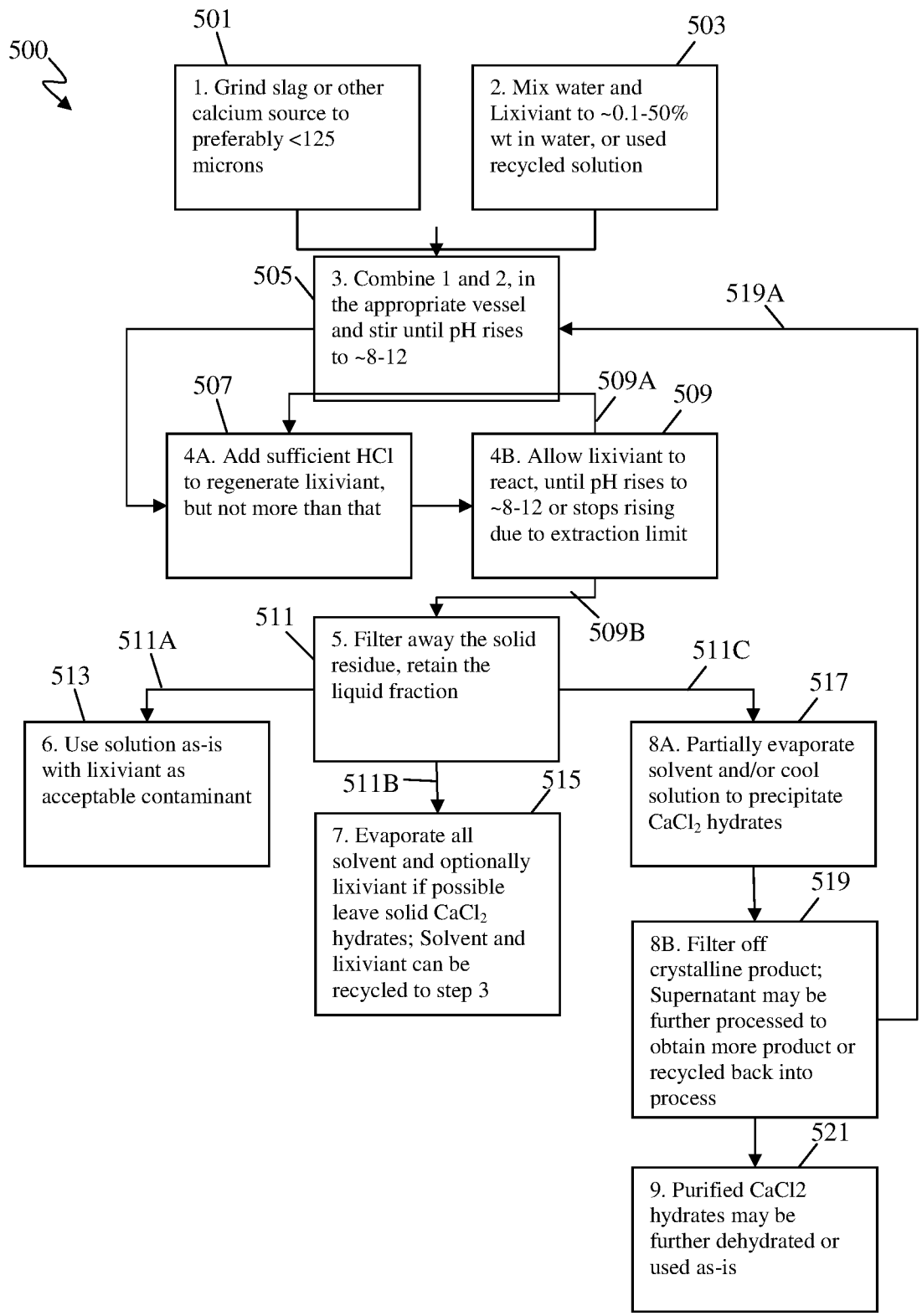
FIG. 5 schematically depicts processing of a steel slag by a method of the inventive concept.

A specific example of the recovery of calcium from steel slag is shown in FIG. 5. Initially, steel slag (or an alternative calcium source) is ground 501 to less than around 125 μm. This greatly increases the surface area available for reaction. Water (used as a solvent) and lixiviant are mixed 503 in a suitable ratio, which can range from 0.1% to about 50%. The ground slag and aqueous lixiviant are mixed 505 and stirred or agitated for a time sufficient to form the calcium cation/counterion pair, in this instance approximately 10 minutes.

The lixiviant is regenerated 507 by the addition of acid, in this instance hydrochloric acid. The newly regenerated lixiviant reacts with more extractable calcium in the source material. The pH can be monitored 509 to judge the progress of the extraction reactions, since the regenerated lixiviant will typically drop the pH of the solution and the extraction will consume the acid causing the pH to rise. More acid can be added 509A based on this observation. If the pH fails to rise completely to an approximate end-point (pH=12) then it can be assumed that all the extractable calcium has been removed from the source material and the process can proceed to the next step.

The solid residue, which is depleted of calcium, is removed by filtration 511 using a variety of industrial filtration techniques, including but not limited to filter press techniques, centrifugation, magnetic separation, settling, and combinations thereof. Based on the end-product, the process can proceed via 511A, 511B, or 511C. If a small amount of lixiviant left in solution would be acceptable, then the solution can be left as-is 513 (via 511A). Alternatively, solid calcium chloride hydrate (mixture of hydrates possible) can be produced by removing the solvent from the calcium chloride solution 515 (via 511B), which leaves behind solid calcium chloride hydrates ($CaCl_2 \cdot xH_2O$, where x can be 0, 1, 2, 4 or 6 depending on how vigorously the solids are dried). Finally, purified, crystalline calcium chloride hydrate (mixture of hydrates possible) can be produced evaporating some of the solvent and/or cooling the solution below the saturation point 517 (via 511C), isolating the crystalline calcium chloride product by filtering off the supernatant 519, and dehydrating the calcium chloride hydrate(s) by heating them to drive off the associated water 521. It is contemplated that the supernatant in 515 and 519 can be recycled back to collect additional crops of crystalline product or it can be recycled back to the extraction step 519A.

It should be apparent to those skilled in the art that many more modifications besides those already described are possible without departing from the inventive concepts herein. The inventive subject matter, therefore, is not to be restricted except in the spirit of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Where the specification claims refers to at least one of something selected from the group consisting of A, B, C . . . and N, the text should be interpreted as requiring only one element from the group, not A plus N, or B plus N, etc.

What is claimed is:

1. A mixture utilized in extraction of a metal hydroxide forming species comprising:
   a lixiviant solution comprising a zwitterion species complex comprising a first member of a pair of zwitterions and a second member of a pair of zwitterions;
   a raw material comprising the metal hydroxide forming species, wherein the metal hydroxide forming species comprises an oxide or hydroxide of a metal to be recovered from the raw material,
   wherein the lixiviant solution is formulated to transfer a first member of the pair of zwitterions to the metal hydroxide forming species while forming a partially uncharged second member of the pair of zwitterions, and wherein the partially uncharged second member of the pair of zwitterions is formulated to react with an acid to regenerate the first member of the pair of zwitterions.

2. The mixture of claim 1, wherein the zwitterion species complex is present at substoichiometric quantities relative to the metal hydroxide forming species.

3. The mixture of claim 1, wherein the zwitterion species is an amine containing acid.

4. The mixture of claim 3, wherein the zwitterion species is selected from the group consisting of an amino acid and 3-aminopropanoic acid.

5. The mixture of claim 1, wherein the zwitterion species is a chelating agent.

6. The mixture of claim 5, wherein the zwitterion species is selected from the group consisting of ethylenediaminetetraacetic acid and salts thereof, ethylene glycol tetraacetic acid and salts thereof, diethylene triamine pentaacetic acid and salts thereof, and 1,2-bis(o-aminophenoxy)ethane-N,N,N',N'-tetraacetic acid and salts thereof.

7. The mixture of claim 1, wherein the zwitterion species is selected from the group consisting of a betaine, an ylide, and a polyaminocarboxylic acids.

8. The mixture of claim 1, wherein the first member of the pair of zwitterions and the second member of the pair of zwitterions are the same compound.

* * * * *